(No Model.)
H. WOLPERT.
POCKET APPARATUS FOR DETERMINING THE AMOUNT OF CARBONIC ACID IN MIXTURES OF GASES.
No. 464,543. Patented Dec. 8, 1891.
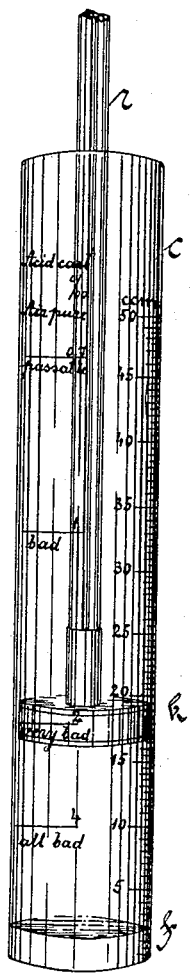

UNITED STATES PATENT OFFICE.

HEINRICH WOLPERT, OF NUREMBERG, GERMANY.

POCKET APPARATUS FOR DETERMINING THE AMOUNT OF CARBONIC ACID IN MIXTURES OF GASES.

SPECIFICATION forming part of Letters Patent No. 464,543, dated December 8, 1891.

Application filed January 27, 1891. Serial No. 379,286. (No model.) Patented in Germany January 12, 1888, No. 44,822.

*To all whom it may concern:*

Be it known that I, HEINRICH WOLPERT, of Nuremberg, in the Kingdom of Bavaria and Empire of Germany, have invented certain new and useful Improvements in Pocket Apparatus for Testing Carbonic Acid in Mixtures of Gases, (for which I have obtained a patent in Germany, No. 44,822, dated January 12, 1888,) of which the following is a specification.

The essential part of the new apparatus is a piston intersected by a tube, (a capillary tube is the best,) which is let down into a cylinder for pressing out the air, and is then gradually lifted in order to admit the gas which is to be tested.

The figure is a view in perspective.

The apparatus, which the figure shows in its almost natural size, has three different scales: first, a scale in cubic centimeters from 1 to 50; second, a scale in $°/_{oo}$, (carbonic acid,) calculated on the lines of chemical equations and applied with the aid of the cubic-centimeter scale; third, a scale of the deterioration of the air, graduated according to the quantities of carbonic acid. In this form, provided with the scale of the deterioration of the air, the apparatus is chiefly destined for testing the air, and this shall be chiefly discussed in the following lines. It is, however, clear that the apparatus can also be used by reason of its cubic-centimeter scale, with the aid of tables or calculations, to ascertain the amount of carbonic acid in any mixture of gases, particularly lighting-gas, which trial is very important, because every per cent. of carbonic acid in lighting-gas diminishes its lighting power by six per cent., and it often happens that the latter contains several per cent. of carbonic acid.

The testing of the amount of carbonic acid in the air is done in the following way: The cylinder $c$, which holds about fifty cubic centimeters, is filled up to a mark with a certain amount—say two cubic centimeters—of a, to a certain degree, diluted-alkaline solution, which is dyed—for instance, by phenolphtaleine red—by some drops of an alkali-indicator. Then by pushing down the piston $k$ with the capillary tube $r$ to the level of the reagent liquid $f$ the air in the cylinder is expelled, whereupon the piston $k$ is lifted to the height of the first carbonic-acid mark, by which process air for trial is let in up to the height. After lifting the piston the piston-tube is shut at once by an india-rubber cap. Then the reagent liquid is shaken for about half a minute, so that all the carbonic acid becomes absorbed. By this process the red reagent liquid gets paler, and if the amount of air is sufficient it gets completely colorless and as clear as water. In this case one sees at once that the tried air contained four $°/_{oo}$ of carbonic acid, and was at any rate extremely bad. If this discoloring is not complete, but the reagent liquid has become sufficiently pale red, the piston is lifted one or two cubic centimeters higher and the liquid is shaken again. If, however, apparently the liquid has rather preserved its previous hue, the piston must be lifted to the height of the next principal mark, 2 $°/_{oo}$. As a rule the piston is to be lifted in proportion to the progress of the discoloring, but never more than a few cubic centimeters when the reagent liquid is very pale. If after shaking the same for a quarter of a minute no change of color is visible, it is no use going on shaking, as the quantity of air is probably not sufficient and one had better admit more air at once by lifting the piston. The carbonic acid of the first quantity of air, which is not found at once, is in no way lost by this manipulation, as no air can escape. Instead of shaking, the same effect is produced by letting the cylinder remain in a horizontal position for some hours.

I claim—

A pocket apparatus for testing carbonic acid in mixtures of gases, consisting of a cylinder provided with a scale indicating the amount of the air at different elevations and a scale having marks indicating the quality of the gas or air, a piston in said cylinder, and a tube connected with said piston, substantially as set forth.

In testimony that I claim the foregoing as my invention I have signed my name in presence of two subscribing witnesses.

HEINRICH WOLPERT.

Witnesses:
ALEX WIELE,
THEODOR MEYER.